(12) United States Patent
Liu et al.

(10) Patent No.: US 6,343,009 B1
(45) Date of Patent: Jan. 29, 2002

(54) MOUNTING DEVICE FOR MOUNTING A DATA STORAGE DEVICE

(75) Inventors: Alvin Liu, Pa-Li; I-Fee Chen, Chung-Li, both of (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/474,107

(22) Filed: Dec. 29, 1999

(30) Foreign Application Priority Data

Nov. 5, 1999 (TW) ........................................ 88218907 U

(51) Int. Cl.$^7$ ................................................ G06F 1/16
(52) U.S. Cl. ........................ 361/684; 361/819; 248/615; 364/708.1
(58) Field of Search ........................ 361/684, 685–688, 361/815, 818, 819; 439/152–160; 360/99.6, 97.01; 248/60, 581, 609, 611, 615, 634, 635, 638; 364/708.1

(56) References Cited

U.S. PATENT DOCUMENTS

| | | | | |
|---|---|---|---|---|
| 5,599,080 A | * | 2/1997 | Ho | 312/334.7 |
| 6,122,165 A | * | 9/2000 | Schmitt et al. | 361/685 |
| 6,141,222 A | * | 10/2000 | Toor et al. | 361/726 |
| 6,185,103 B1 | * | 2/2001 | Yamada | 361/727 |

* cited by examiner

*Primary Examiner*—Leo P. Picard
*Assistant Examiner*—Hung Van Duong
(74) *Attorney, Agent, or Firm*—Wei Te Chung

(57) ABSTRACT

A mounting device for mounting a data storage device in a cage of a computer enclosure includes a rack and a securing plate. The rack has a base wall and a pair of opposite side walls upwardly extending from opposite sides of the base wall for receiving the data storage device therein. One side wall defines a pair of through holes. The other side wall provides a pair of first posts to insert into side holes of the data storage device. The securing plate comprises a body portion and a resilient portion. The body portion forms a pair of second posts for extending through corresponding through holes of the rack and filling within opposite side holes of the data storage device after the data storage device is received in the rack.

7 Claims, 7 Drawing Sheets

MOUNTING DEVICE FOR MOUNTING A DATA STORAGE DEVICE

BACKGROUND OF THE INVENTION

1. Field of the invention

The present invention relates to a mounting device for mounting a data storage device to a computer enclosure, and particularly to a mounting device that conveniently mounts the data storage device to a computer without screws.

2. The Related Art

Data storage devices normally used in a personal computer include a hard disk drive (HDD), a floppy disk drive (FDD) and a compact disc read only memory (CD-ROM). A data storage device is often fixed in a receiving cage of a computer by bolts. When mounting the data storage device to the computer enclosure, an assembler must align the data storage device with the receiving cage with one hand and tighten the bolts with the other hand. This process is tedious and laborious. Therefore, rails are attached to both sides of a data storage device to simplify the installation process, such as those described below.

Taiwan Patent Application Nos. 78201813 and 79209891 and U.S. Pat. Nos. 5,332,306 and 5,262,923 disclose a rail type mounting device whose rails are attached to both sides of a data storage device to slidably mount the data storage device in a cage of a computer. However, the rails are attached to the data storage device by conventional screws. The problem of the time-consuming and cumbersome task of tightening the screws is still not resolved.

U.S. Pat. No. 5,599,080 and its corresponding Taiwan Patent Application No. 85210034 disclose a rail type mounting device without screws whose rail are attached to a data storage device by pushing pins integral with the rail into side holes in the data storage device. However, the pins are thin and flexible, and are easily bent during operations such as removing the data storage device from a computer. Once the pins become bent, subsequent alignment and reconnection of the data storage device to a cage of the computer will be quite difficult. Moreover, the data storage device can not be firmly secured due to existing gap defined between the pin and the hole, thus easily causing the data storage device to be shocked.

The present invention overcomes the above disadvantages by providing an improved mounting device for mounting a data storage device to a computer enclosure.

SUMMARY OF THE INVENTION

An object of the present invention is to provide a mounting device for conveniently mounting a data storage device to a computer enclosure without screws.

In order to achieve the object set forth, a mounting device for mounting a data storage device in a cage of a computer in accordance with the present invention includes a rack and a securing plate. The rack has a base wall and a pair of opposite side walls upwardly extending from opposite sides of the base wall for receiving the data storage device therein. One side wall defines a pair of through holes. The other side wall provides a pair of first posts to insert into side holes of the data storage device. The securing plate comprises a body portion and a resilient portion. The body portion forms a pair of second posts for extending through corresponding through holes of the rack and filling within opposite side holes of the data storage device. Therefore, the data storage device is secured in the rack with the securing plate on its side to slidably mount the data storage device in the cage of the computer.

These and additional objects, features and advantages of the present invention will become apparent after reading the following detailed description of the preferred embodiments of the invention taken in conjunction with the appended drawings.

DETAILED DESCRIPTION OF THE PREFERRED EMBODIMENTS

Figure 1:
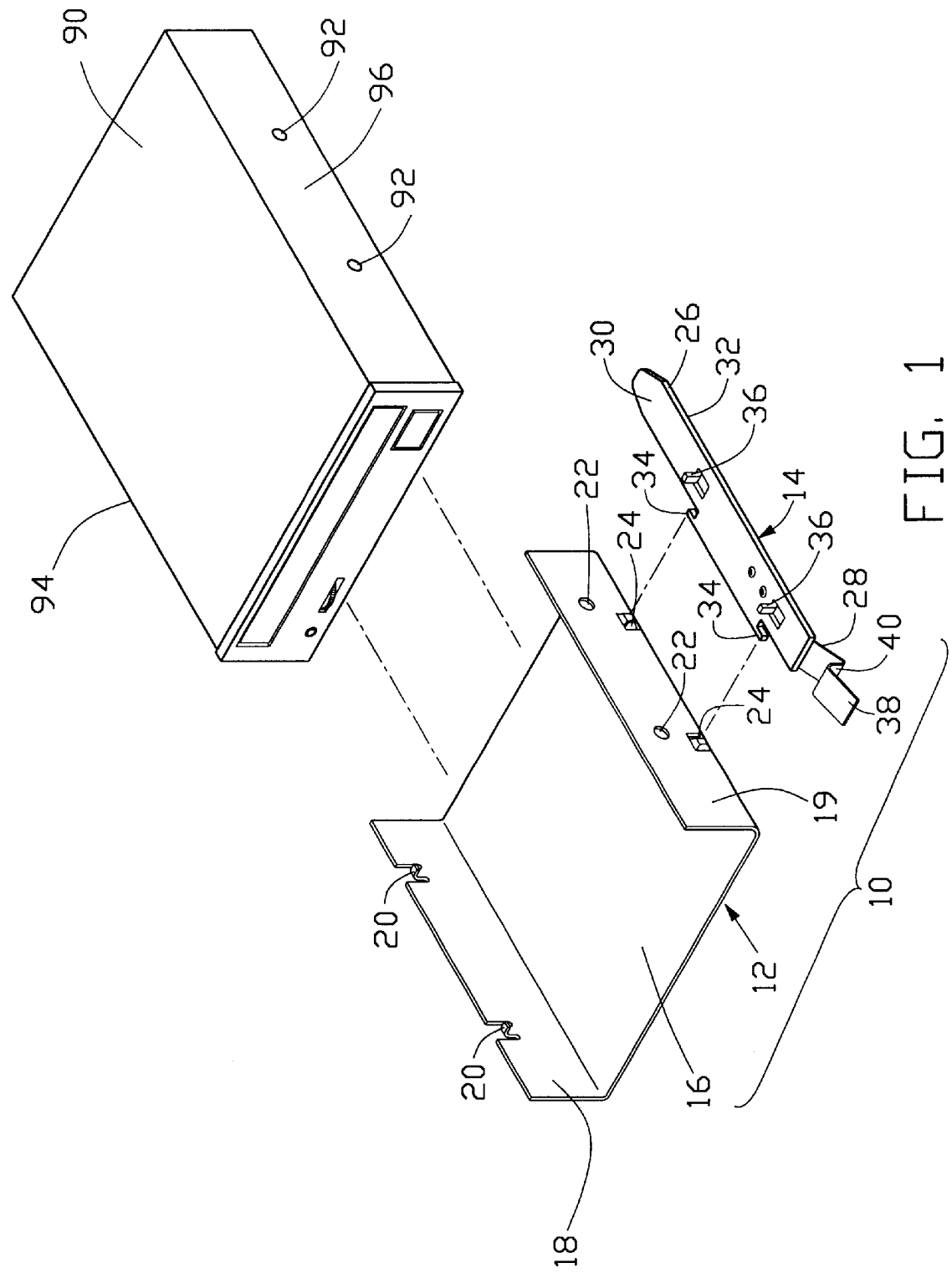
FIG. 1 is an exploded view of a mounting device in accordance with a first embodiment of the present invention.

It is noted here that for facilitating understanding like components are designated by like reference numerals throughout the various embodiments of the present invention as shown in the attached drawing figures.

A mounting device constructed in accordance with the present invention is used to mount a data storage device, such as a CD-ROM, an FDD or an HDD. To facilitate the description, a CD-ROM is used as an example to illustrate the function of the present invention.

Referring to FIGS. 1–4, a mounting device 10 in accordance with a first embodiment of the present invention mounts a CD-ROM 90 to a computer enclosure 100. The CD-ROM has a first side surface 94, and a second side surface 96 opposite the first side surface 94. The first and the second side surfaces 94, 96 respectively define a pair of side holes 92. The mounting device 10 comprises a rack 12 for receiving the CD-ROM 90 therein and a securing plate 14 for securing the CD-ROM 90 in the rack 12 and providing the CD-ROM 90 with sliding movement during insertion into or removal from the computer enclosure 100.

Referring to FIG. 1, the rack 12 is U-shaped comprising a base wall 16 and a pair of first and second side walls 18, 19 upwardly extending from opposite sides of the base wall 16. A pair of first posts 20 inwardly extends from an upper edge of the first side wall 18. The second side wall 19 defines a pair of through holes 22. A pair of pivoting holes 24 is stampingly formed in the second side wall 19 with a portion projecting outward.

The securing plate 14 comprises a body portion 26 and a resilient portion 28. The body portion 26 is a rectangular board containing a first surface 30 and a second surface 32 opposite the first surface 30. A pair of pivots 34 extends from the body portion 26 for inserting into the pivoting holes 24 respectively and pivotally mounting the securing plate 14 to an outer surface of the second side wall 19. A pair of second posts 36 extend from the first surface 30 for inserting through the through holes 22 of the rack 12 and filling within corresponding side holes 92 of the CD-ROM 90. The resilient portion 28 comprises a front operating portion 38 and a middle locking portion 40. The rear end of the resilient portion 28 is securely fixed to the second surface 32 of the body portion 26.

Figure 2:
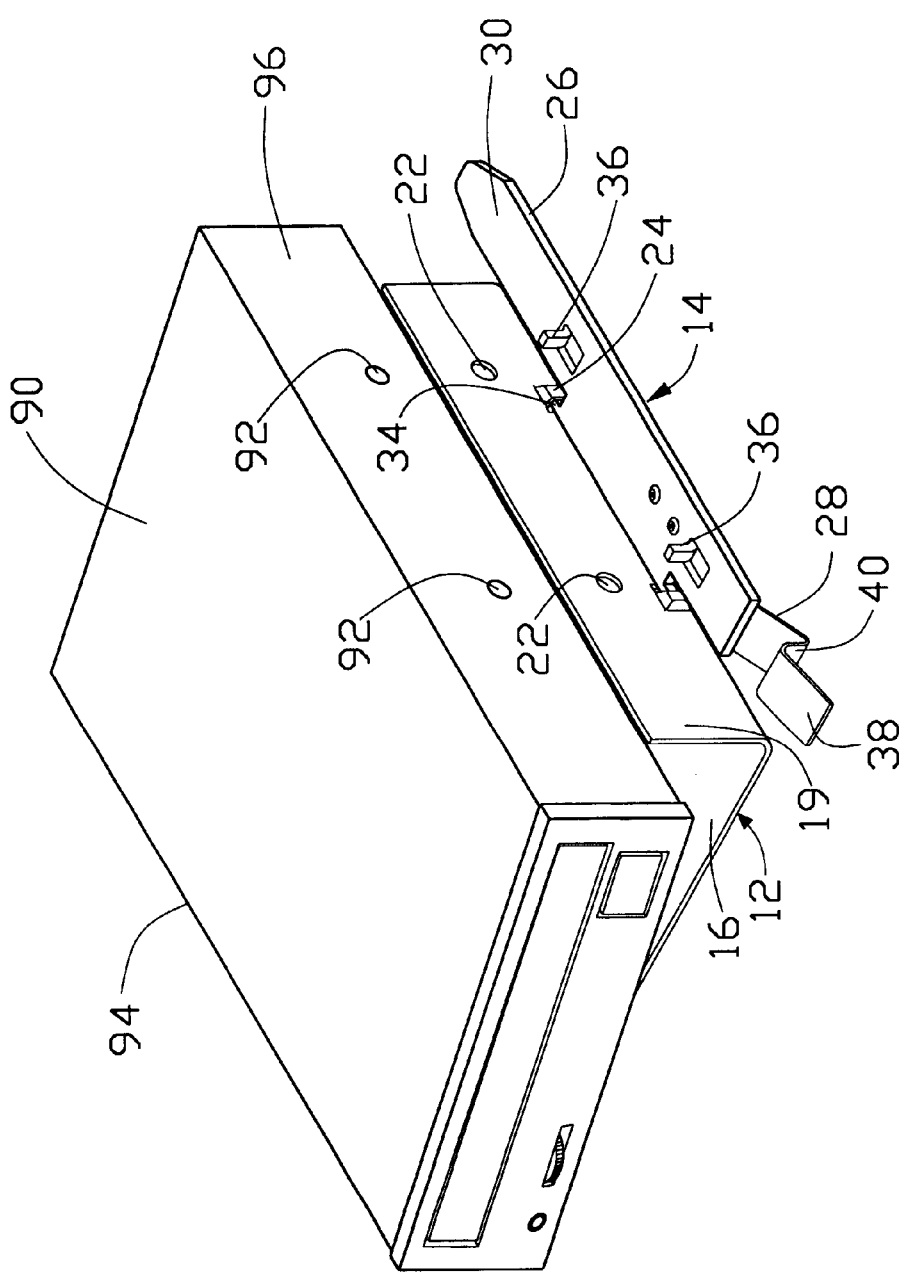
FIG. 2 is a perspective view showing the assembly of the mounting device with a data storage device.
Figure 3:
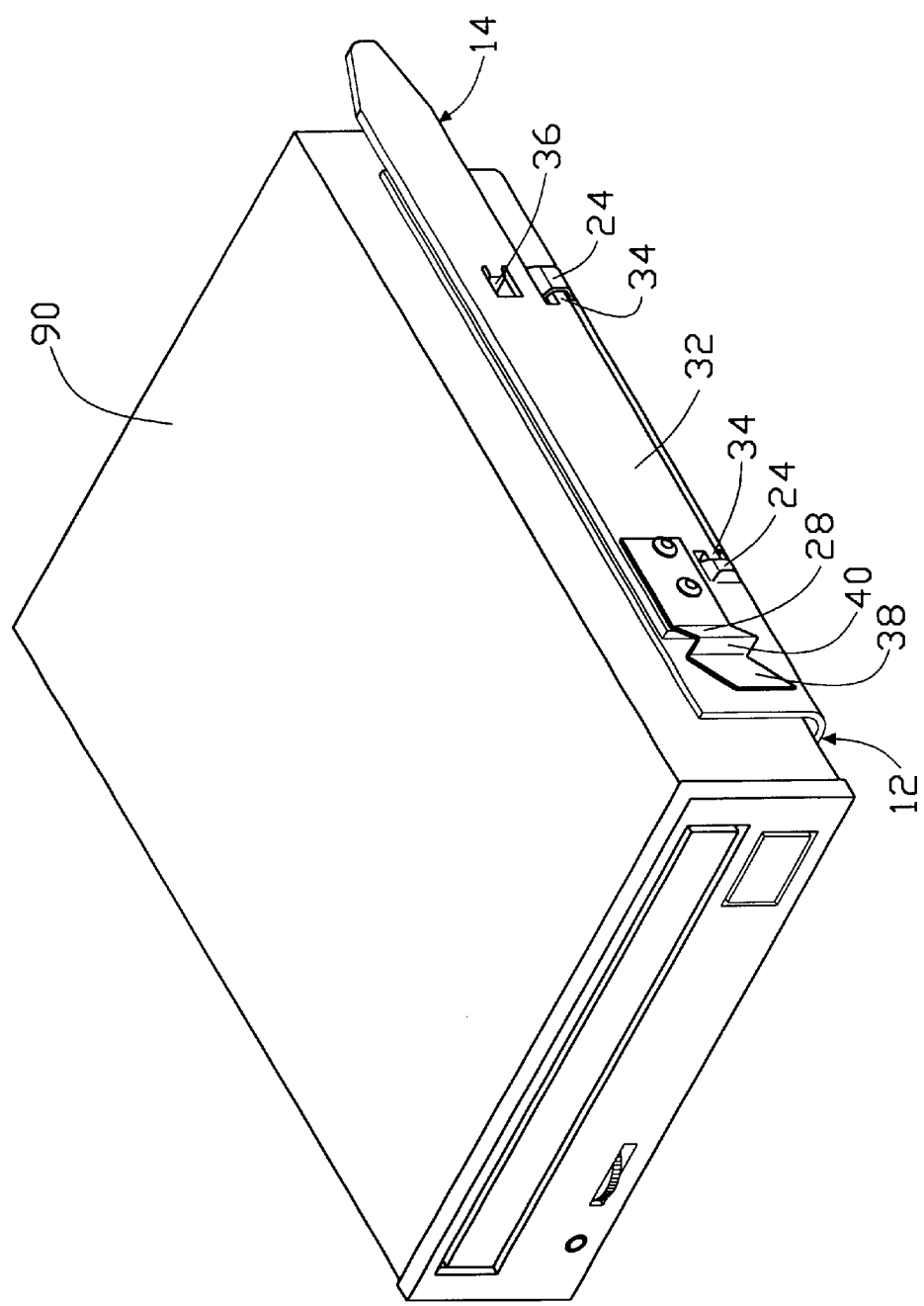
FIG. 3 is an assembled view of the mounting device and the data storage device.

Referring to FIGS. 2 and 3, in assembly, the pivots 34 of the securing plate 14 are in advance engaged within the pivoting holes 24 of the rack 12 thereby pivotally mounting the securing plate 14 to the second side wall 19 of the rack 12. The CD-ROM 90 is then slantly placed in the rack 12 and the first posts 20 of the first side wall 18 are inserted in the side holes 92 of the first side surface 94. Then the CD-ROM 90 are pressed and received in the rack 12 where the side holes 92 in the second side surface 96 of the CD-ROM 90 are aligned with the through holes 22 in the second side wall 19. Rotate the securing plate 14 with respect to the second side wall 19 until each second post 36 is inserted and retained in the aligned holes 22, 92.

Figure 4:
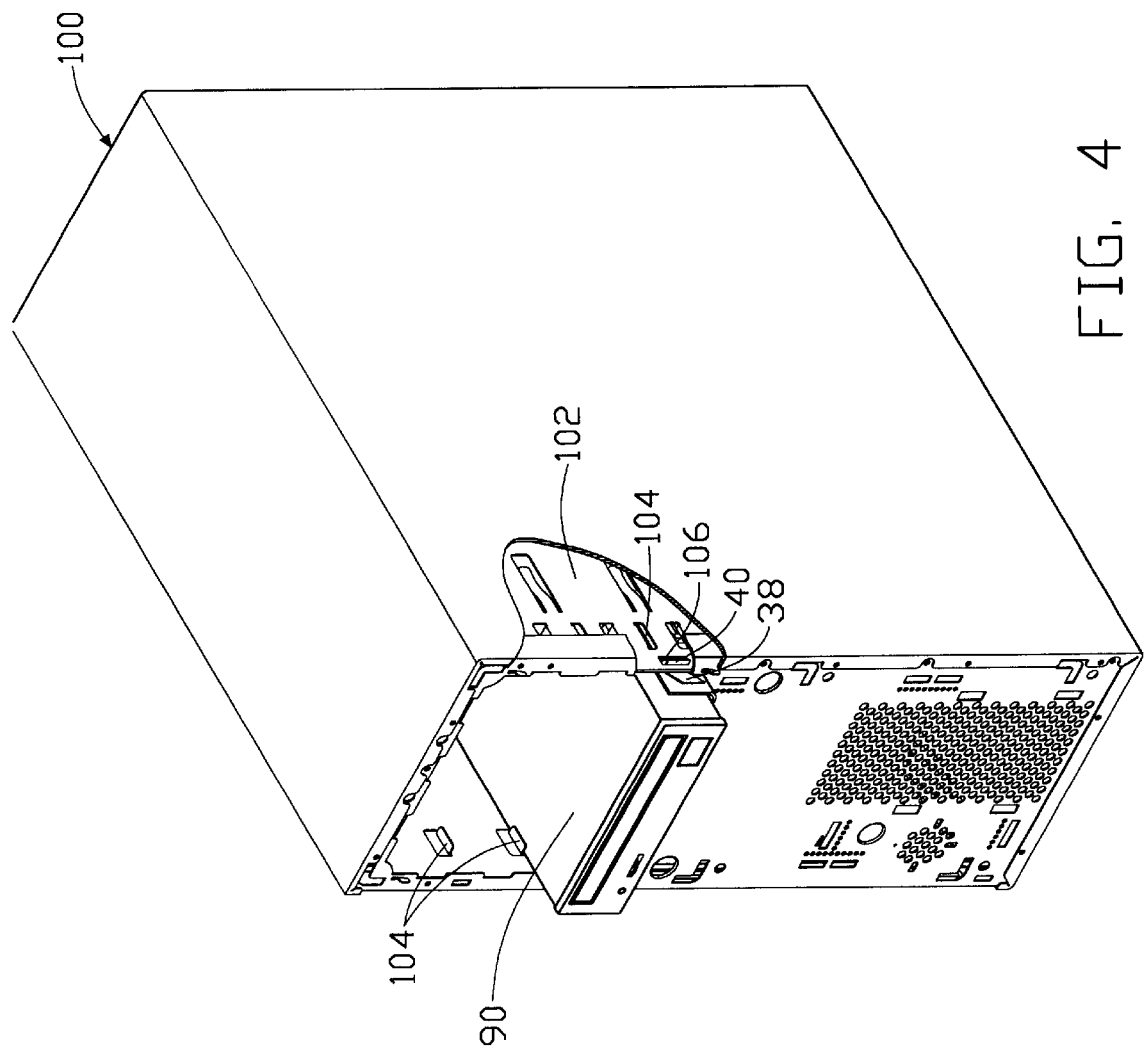
FIG. 4 is a perspective view showing the data storage device mounted to a computer enclosure by means of the mounting device of FIG. 1.
Figure 5:
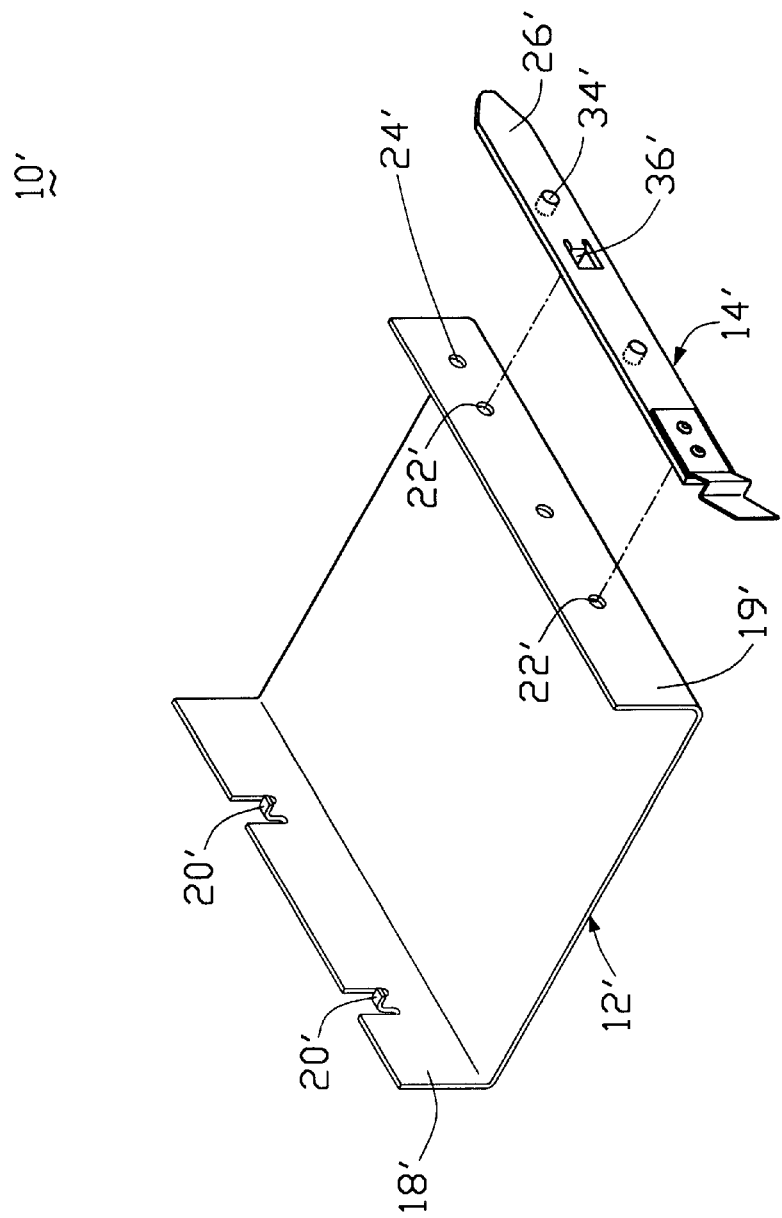
FIG. 5 is an exploded view of a mounting device in accordance with a second embodiment of the present invention.
Figure 6:
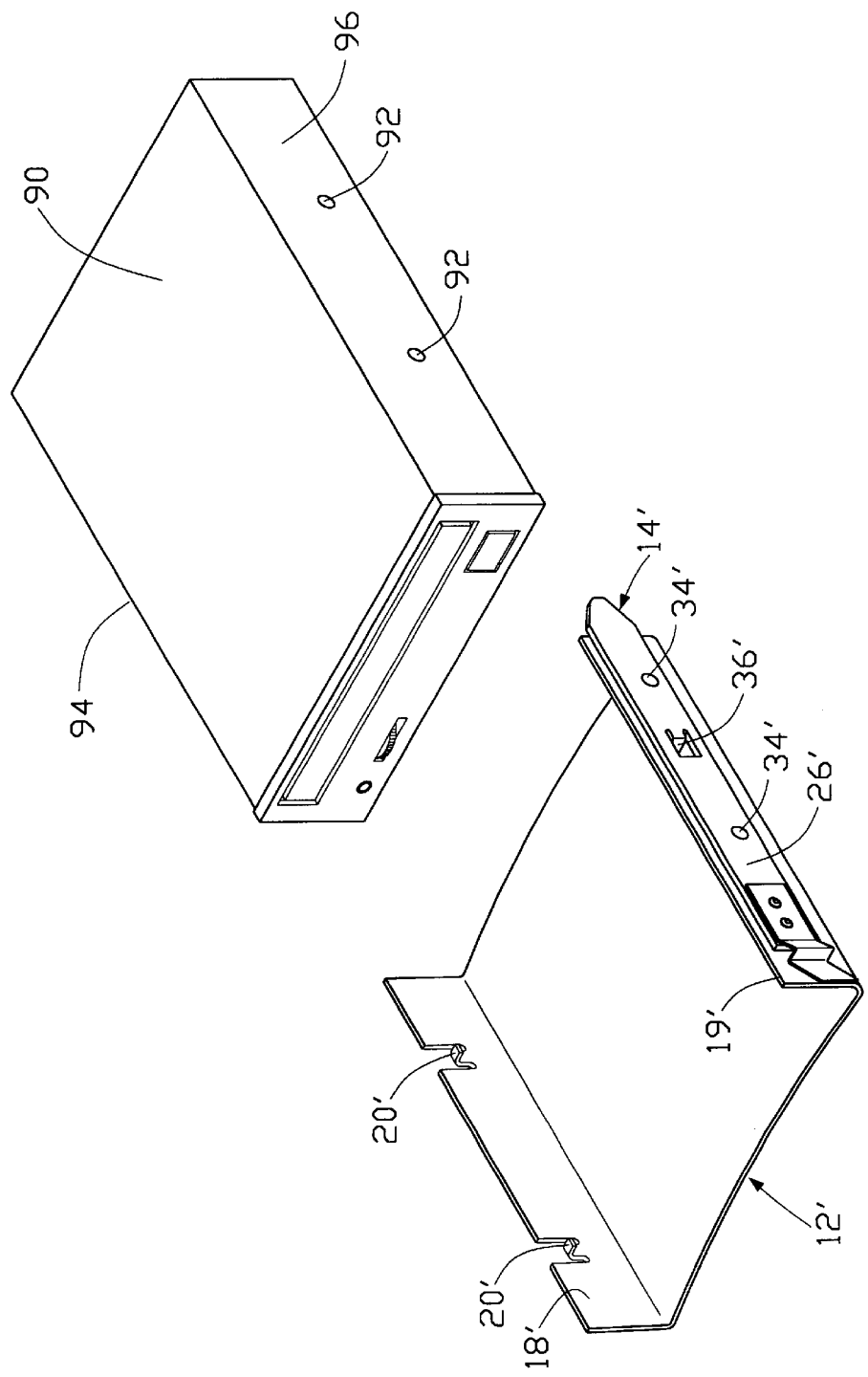
FIG. 6 is an exploded view showing a data storage device to be mounted to the mounting device of FIG. 5.
Figure 7:
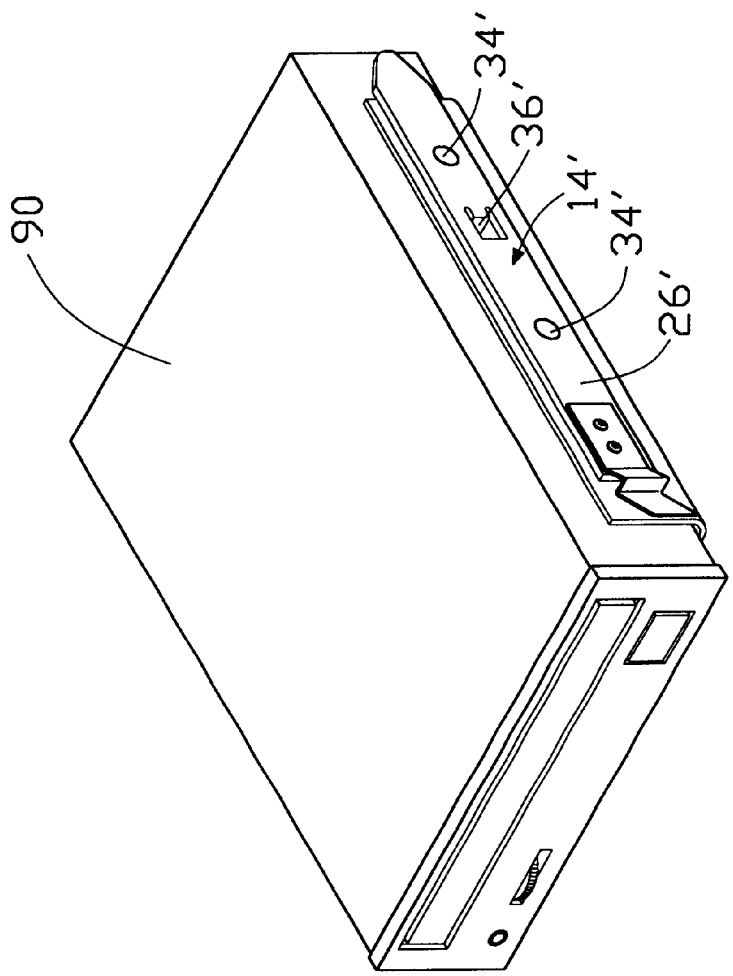
FIG. 7 is an assembled view of the mounting device and the data storage device of FIG. 6.

FIG. 4 illustrates the mounting of the CD-ROM 90 to a cage 102 of the computer enclosure 100 by means of the mounting device 10. The CD-ROM 90 and the mounting device 10 are slid into the cage 102 by sliding the securing plate 14 of the mounting device 10 along corresponding adjacent guide rails 104 formed in opposite inner walls of the cage 102. The CD-ROM 90 together with the mounting device 10 are then retained between adjacent guide rails 104 of the cage 102, with the locking portion 40 of the resilient portion 28 being forcedly locked in a corresponding slot 106 defined in the cage 102. The removal of the CD-ROM 90 together with the mounting device 10 from the cage 102 only needs a reverse operation by pulling the operating portion 38 of the resilient portion 28 outward to release the locking portion 40 from the slot 16. FIGS. 5–7 illustrate a mounting device 10' in accordance with a second embodiment of the present invention. Most of the structures of the second embodiment are the same as those of the first embodiment, so the similar description is omitted herein. The difference is in that the securing plate 14' and the rack 12' are connected by rivets 34' extending from the securing plate 14' and holes 24' defined in the second side wall 19' of the rack 12'. When the securing plate 14' is secured to the rack 12', the second post 36' extend through the through holes 22'. Since the rivet joint technique is well known to those skilled in the art, a detailed description thereof is omitted herein. The rack 12' is formed of a thin sheet metal material such as stainless steel to provide resiliency during mounting the CD-ROM 90 therein. In assembly, the first and the second side walls 18', 19' of the rack 12' are outwardly pulled respectively to receive the CD-ROM 90 therein. After the first and the second side walls 18', 19' resume to their original position, the first and the second posts 20', 36' are inserted into the side holes 92 of the first and the second side surfaces 94, respectively, thereby retaining the CD-ROM 90 in the rack 12'.

While the present invention has been described in reference to specific embodiments thereof, the description is illustrative and is not to be construed as limiting the invention. Various modifications to the present invention may be made to the preferred embodiments by those skilled in the art without departing from the true spirit and scope of the invention as defined by the appended claims.

We claim:

1. A mounting device adapted to mount a data storage device in a computer enclosure, the data storage device having a first side surface and an opposite second side surface, the first and the second side surface each defining at least one side hole, the mounting device comprising:

a rack being adapted to receive the data storage device, the rack having a base wall and a pair of first and second side walls upwardly extending from opposite sides of the base wall, the first side wall integrally forming at least one first post inserted into the side hole in the first side surface of the data storage device, the second side wall defining at least one through hole aligned with the side hole in the second side surface of the data storage device and a pair of pivoting holes; and a securing plate having a pair of pivots inserted into the pivoting holes for pivotally mounting the securing plate to the second side wall, a corresponding number of second posts inserted and retained in the aligned through hole and side hole for securing the data storage device in the rack and for securing the securing plate on the second side wall, and a resilient portion sidewardly operable to releasably engage the data storage device with the computer enclosure, wherein the resilient portion has a front operating portion, a middle locking portion and a rear end securely fixed to the second surface of the body portion.

2. The mounting device as claimed in claim 1, wherein the securing plate comprises a body portion having a first surface fixed to the rack and an opposite second surface, and wherein the resilient portion is attached to the second surface of the body portion.

3. A mounting device adapted to mount a data storage device in a computer enclosure, the data storage device having a first side surface and an opposite second side surface, the first and the second side surface each defining at least one side hole, the mounting device comprising:

a rack being adapted to receive the data storage device, the rack having a base wall and a pair of first and second side walls upwardly extending from opposite sides of the base wall, the first side wall integrally forming at least one first post inserted into the side hole in the first side surface of the data storage device, the second side wall defining at least one through hole aligned with the side hole in the second side surface of the data storage device; and a securing plate securely fixed to the second side wall of the rack for slidably mounting the data storage device in the computer enclosure, the securing plate having a body portion forming a corresponding number of second posts inserted and retained in the aligned through hole and side hole for securing the data storage device in the rack, and a resilient portion having a front operating portion, a middle locking portion and a rear end securely fixed to an outer surface of the body portion.

4. The mounting device as claimed in claim 3, wherein the rack is formed of a thin sheet metal material.

5. A mounting device for mounting a storage device therein comprising a U-shaped rack to which a securing plate is pivotally attached, the U-shaped rack forming at least one pole at a vertical wall thereof for engaging with a corresponding aperture in a side of the storage device, and at least one hole in an opposite vertical wall thereof, the securing plate having an extension portion projected therefrom for passing through the at least one hole of the U-shaped rack to abut against the storage device received in the U-shaped rack when the securing plate is pivotally moved to the vertical wall of the U-shaped rack, the securing plate further comprising a resilient portion for latchably securing the U-shaped rack to a computer enclosure.

6. The mounting device as claimed in claim 5, wherein the securing plate forms a pair of pivots inserted in corresponding pivoting holes defined in the vertical wall of the rack.

7. An electrical assembly comprising:

a cage defining a locking slot in a front portion thereof;

a storage device positioned in the cage and defining side holes in two opposite side faces;

a U-shaped rack defining two side walls, one of said two side walls defining at least a post received within the corresponding side hole in one of said two side faces, and the other of said two side walls defining at least a through hole in alignment with the corresponding side hole in the other of said two side faces;

a securing plate attached to the other of said two side walls with another post extending through both the corresponding through hole of the other of said two side walls and the corresponding side hole of the other of said two side faces for securing the data storage device to the rack; and a resilient portion formed on a front portion of the securing plate and having a locking portion thereof latchably engaged within the locking slot.

* * * * *